(12) United States Patent
Eull

(10) Patent No.: US 7,175,189 B1
(45) Date of Patent: Feb. 13, 2007

(54) BOOSTER AXLE PIVOT MOUNT

(75) Inventor: Thomas E. Eull, Blaine, MN (US)

(73) Assignee: Schwing America, Inc., White Bear Lake, MN (US)

( * ) Notice: Subject to any disclaimer, the term of this patent is extended or adjusted under 35 U.S.C. 154(b) by 423 days.

(21) Appl. No.: 10/800,979

(22) Filed: Mar. 15, 2004

(51) Int. Cl.
*B62D 61/12* (2006.01)

(52) U.S. Cl. .................. 280/86.5; 180/209; 180/24.02

(58) Field of Classification Search ............... 280/704, 280/87.1, 86.5, 43.17, 81.1, 80.1, 81.6, 43, 280/85, 124.116, 124.128; 780/209, 24.02; 403/26, 53, 61
See application file for complete search history.

(56) References Cited

U.S. PATENT DOCUMENTS

| | | | |
|---|---|---|---|
| 3,885,808 A * | 5/1975 | Derrwaldt ................. | 280/81.1 |
| 4,421,331 A * | 12/1983 | Ferris ....................... | 280/81.1 |
| 4,762,421 A * | 8/1988 | Christenson et al. ........ | 366/54 |
| 5,498,021 A | 3/1996 | Christenson | |
| 5,897,123 A | 4/1999 | Cherney et al. | |
| 6,135,469 A * | 10/2000 | Hulstein et al. ........... | 280/86.5 |
| 6,371,499 B1 * | 4/2002 | Konop ....................... | 280/86.5 |
| 6,478,317 B2 | 11/2002 | Konop | |

\* cited by examiner

*Primary Examiner*—Paul N. Dickson
*Assistant Examiner*—Tiffany L. Webb
(74) *Attorney, Agent, or Firm*—Kinney & Lange, P.A.

(57) ABSTRACT

A mounting bracket is attachable to a vehicle frame for pivotally connecting a booster axle assembly comprising a pair of spaced arms, each arm having a first end, a second end, and an axle connected therebetween. The mounting bracket includes a U-shaped portion having a base and a pair of spaced legs connected to the base and extending in a first direction generally normal to the base. The pair of spaced legs and base define a space for receiving the first end of one of the arms of the booster axle assembly. Each leg defines first and second spaced appendages that define a slot. A mounting plate is connected to the base of the U-shaped portion and extends in a second direction normal to the base to permit connection of the mounting bracket to the vehicle frame.

16 Claims, 5 Drawing Sheets

BOOSTER AXLE PIVOT MOUNT

BACKGROUND OF THE INVENTION

The present invention generally relates to mounting brackets. More particularly, the present invention relates to a mounting bracket for pivotally connecting a booster axle assembly to a vehicle frame.

Vehicles, particularly work trucks such as concrete mixing trucks, can carry a large volume of heavy, viscous material, such as concrete, in a drum located in a rearward region of the truck. Such work trucks often include a booster axle assembly. Booster axle assemblies are synonymously referred to as tag axle assemblies, swing-frame assemblies, or auxiliary axle assemblies. The booster axle assembly may be engaged, when lowered such that a pair of wheels attached to the booster axle assembly contact ground or a pavement surface, or stowed, when the booster axle assembly is raised and a pair of wheels are lifted off the ground.

Engagement of the booster axle assembly provides additional load-carrying capacity to the work truck by supplementing steering and drive axles of the truck. The booster axle assembly assists in distributing a load carried by the truck, such as a concrete mixing truck with a fully loaded drum. This increases spacing between axles and an overall front-to-back axle spacing. Also, engagement of the booster axle assembly allows a higher total payload to be carried by the truck under weight restriction regulations established by state and federal government bodies, which are typically measured in terms of load per axle in combination with spacing provided between axles of the vehicle.

The present invention provides an alternative to known booster axle pivot mount designs.

BRIEF SUMMARY OF THE INVENTION

The present invention relates to a mounting bracket capable of attachment to a vehicle frame for pivotally connecting a booster axle assembly having a pair of spaced arms, each arm having a first end and a second end, and an axle connected between the pair of spaced arms near the second end of the arms. The mounting bracket includes a U-shaped portion having a base disposed in a plane extending in X and Y dimensions and a pair of spaced legs connected to the base and extending in a first direction generally normal to the base in a Z dimension. Each leg of the pair of spaced legs has a free end. The pair of spaced legs and base define a space for receiving the first end of one of the arms of the booster axle assembly. Each leg defines first and second appendages spaced apart in the Y dimension. The first and second appendages of each leg define a slot that extends in the Z dimension from the free end of the leg toward the base. A mounting plate is connected to the base of the U-shaped portion and extends in a second direction normal to the base in the Z dimension.

DETAILED DESCRIPTION

A booster axle pivot mount permits pivotal attachment of a booster axle assembly to a rear end of a vehicle or work truck. By pivoting the booster axle assembly about the pivot mount, an axle and a pair of wheels can be selectively raised and lowered to stowed and engaged positions.

Figure 1:
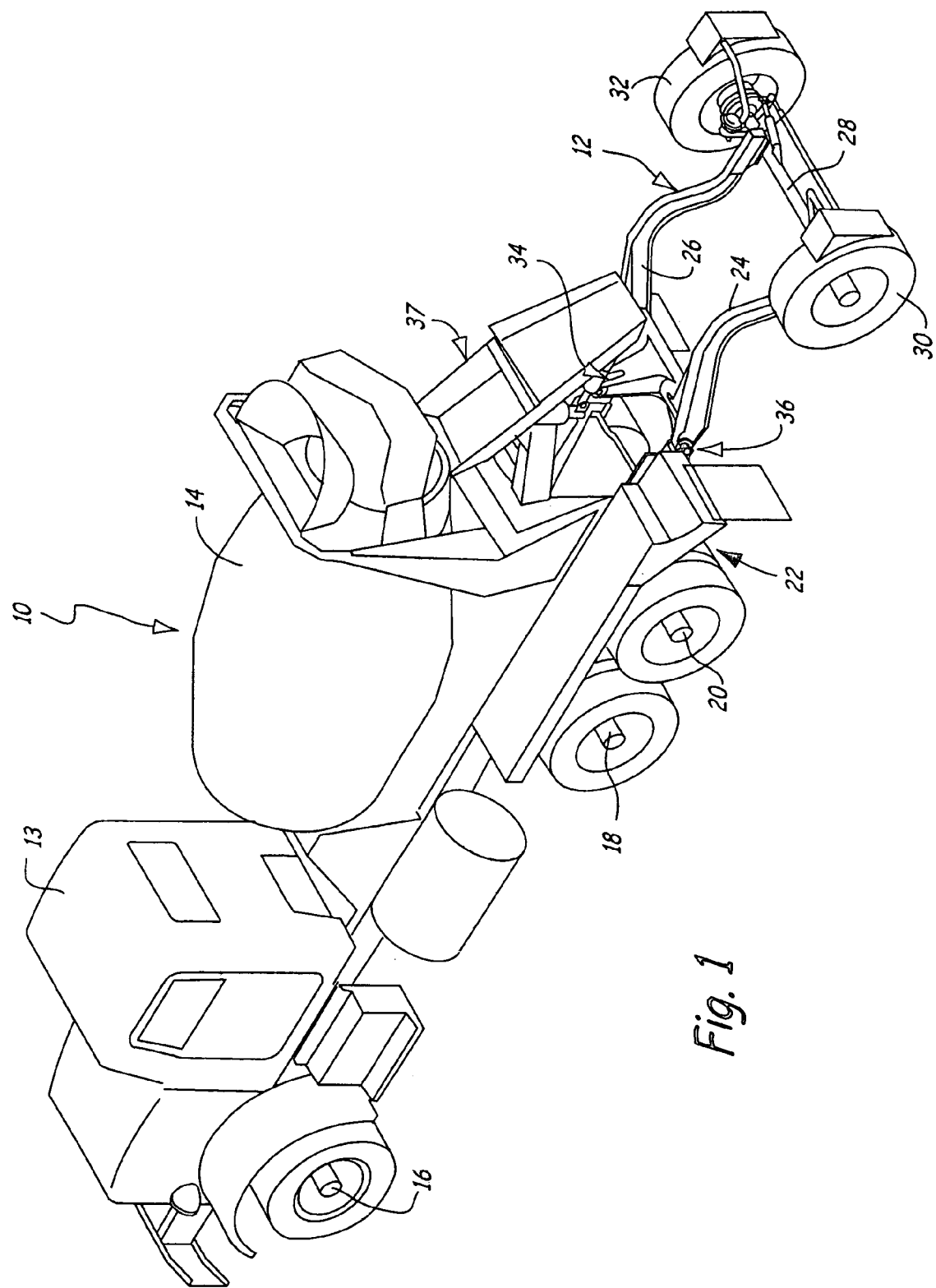
FIG. 1 is a perspective view of a work truck having a booster axle assembly.

FIG. 1 is a perspective view of a work truck 10 having a booster axle assembly 12. Truck 10 further includes a front cab 13, a rotatable drum 14, a steering axle 16, one or more rear axles 18 and 20 located near a rear end 22 of truck 10. Booster axle assembly 12 includes a pair of spaced arms 24 and 26, an axle 28, and a pair of wheels 30 and 32 operably connected to axle 28. An actuation means 34 operably connects booster axle assembly 12 and rear end 22 of truck 10 for raising and lowering booster axle assembly 12. A pivot mount system 36 pivotally connects booster axle assembly 12 and rear end 22 of truck 10. A conventional chute-like material delivery assembly 37 is positioned at the rotatable drum 14 near the rear end 22 of the truck 10.

Figure 2:
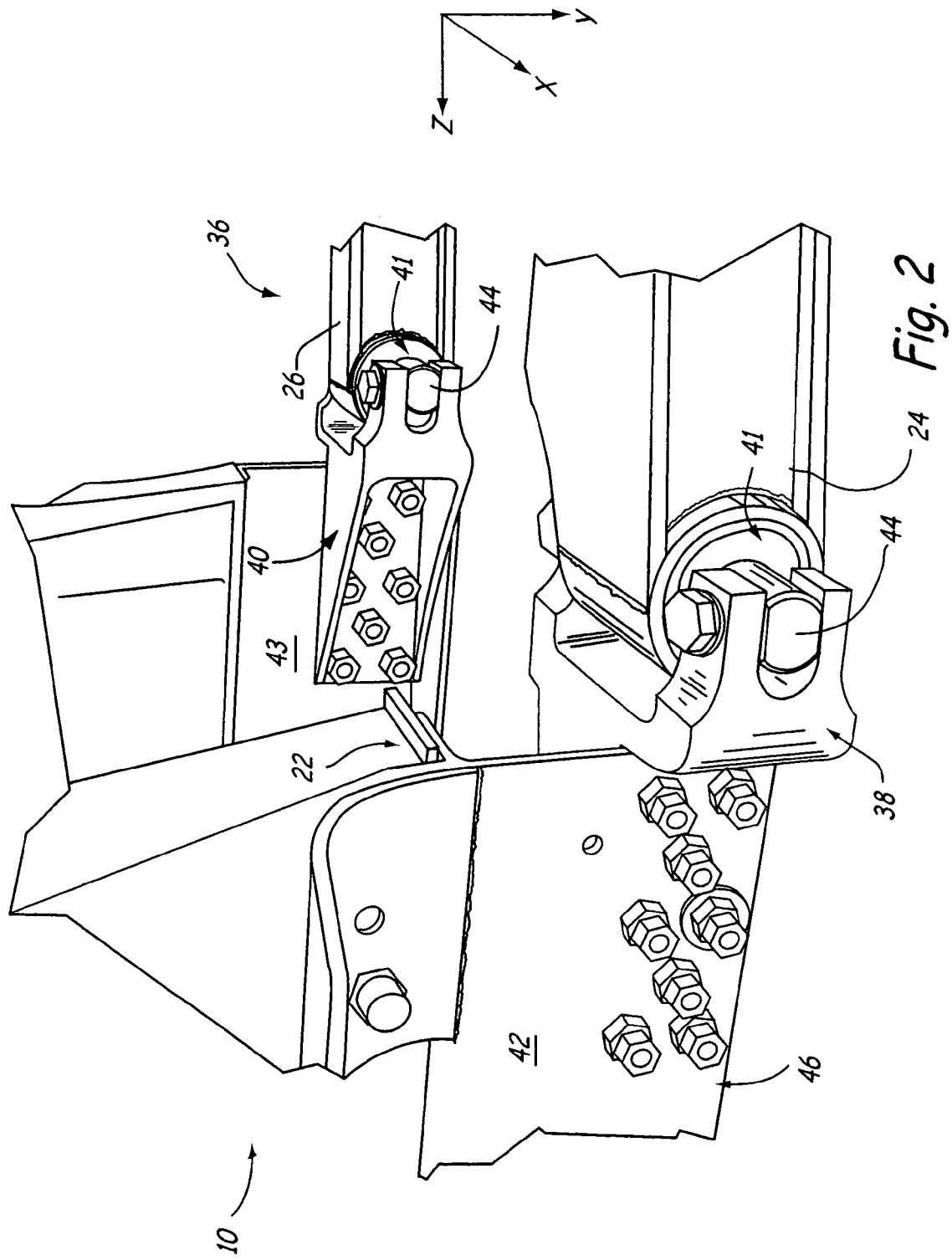
FIG. 2 is an enlarged perspective view of a pivot mount system.

FIG. 2 is an enlarged perspective view of pivot mount system 36 of the present invention. Pivot mount system 36 generally comprises a pair of mounting brackets 38 and 40 attached to truck 10, a pair of pivot bearings 41 secured to ends of spaced booster axle assembly arms 24 and 26, and a pair of pivot pins 44 for connecting each pivot bearing 41 to a respective mounting bracket 38 and 40. Mounting brackets 38 and 40 are attached to first and second frame members 42 and 43, respectively, of a vehicle frame 46 at or near rear end 22 of truck 10. Typically, mounting brackets 38 and 40 are disposed adjacent lower portions of frame members 42 and 43. As seen in FIG. 2, mounting brackets 38 and 40 are disposed relative a coordinate system that defines width in a X dimension, height in a Y dimension, and length in a Z dimension.

Each pivot bearing 41 is a cylindrical polymer bearing housed within a metal bearing housing that is welded to each end of arms 24 and 26. A suitable pivot bearing is a bar pin end bushing model EB38651, manufactured by ATRO Engineered Systems of Sullivan, MO.

Figure 3:
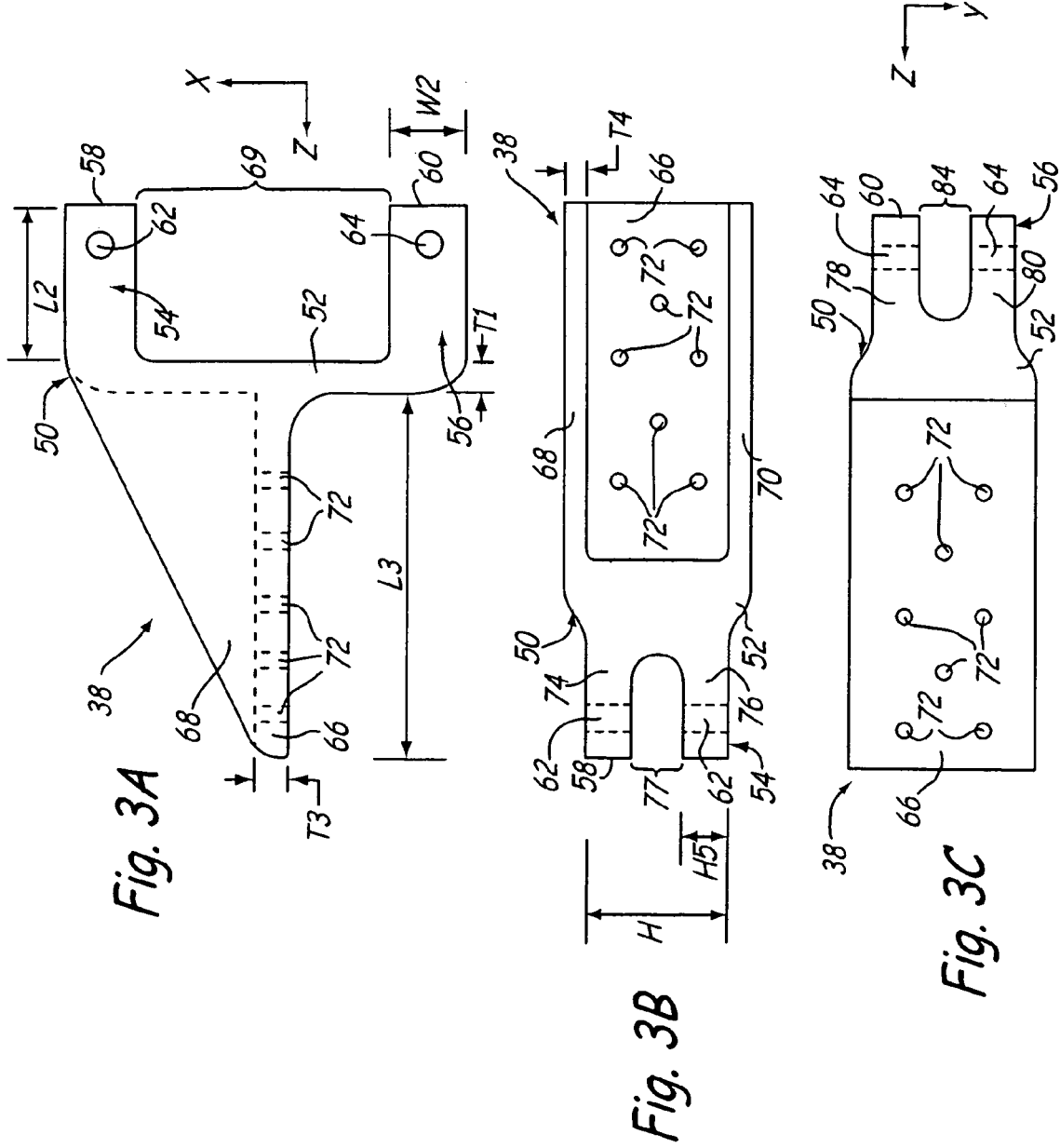
FIG. 3A is a top view of a mounting bracket.
FIG. 3B is a right side elevation of the mounting bracket.
FIG. 3C is a left side elevation of the mounting bracket.

FIGS. 3A–3C show mounting bracket 38 in further detail. FIG. 3A is top view of mounting bracket 38 which shows that mounting bracket 38 comprises a U-shaped portion 50 having a base 52 and a pair of spaced legs 54 and 56 extending in a first direction generally normal to base 52 (i.e., in a dimension denoted by line Y). Legs 54 and 56 terminate at free ends 58 and 60, and have holes 62 and 64 formed therethrough near the respective free ends 58 and 60.

The pair of spaced legs 54 and 56 define a space 69 for receiving a first end of an arm of a booster axle assembly. The particular dimensions of mounting bracket 38, including space 69, will vary according to the particular requirements of applications in which booster axle assemblies are used. In one embodiment, base 52 has a nominal wall thickness T1 of about 1.0 inch. Spaced legs 54 and 56 each have a nominal width W2 of about 2.0 inches and a nominal length L2 of about 4.63 inches. The distance between legs 54 and 56 forming space 69 is about 6.44 inches.

Mounting bracket 38 further includes a mounting plate 66 and a gusset 68. Mounting plate 66 extends generally normal to base 52 of U-shaped portion 50, in a direction opposite legs 54 and 56. Gusset 68 connects mounting plate 66 and base 52 of U-shaped portion 50. Mounting plate 66 has a nominal length L3 of about 11.0 inches and a nominal wall thickness T3 of about 1.0 inch. Mounting plate 38 is formed of a cast metal, such as steel.

FIG. 3B is a right side elevation of mounting bracket 38. As seen in FIG. 3B, in addition to gusset 68, mounting bracket 38 includes a second gusset 70, located at a bottom of mounting plate 66 (dimension lines to shown for FIG. 3B). In one embodiment, gussets 68 and 70 have a nominal wall thickness T4 of about 0.44 inches and mounting plate 66 has a nominal height of about 5.0 inches. Mounting plate 66 further includes a plurality of openings 72 for attaching mounting bracket 38 to a vehicle frame via complementary holes in the vehicle frame member. As further shown in FIG. 3B, leg 54 of U-shaped portion 50 is configured with first and second spaced appendages 74 and 76, which are spaced to define a slot 77. Slot 77 extends from free end 58 of leg 54, toward base 52 of U-shaped portion 50 to receive pivot pin 44 of pivot bearing 41. Hole 62 extends through appendages 74 and 76. In one embodiment, leg 54 has an overall height H of about 3.62 inches. Each appendage 74 and 76 has a nominal height H5 of about 0.81 inches and the distance between appendages 74 and 76, which defines slot 77, is about 2.0 inches. As shown in FIG. 3C, which is a left side elevation of mounting bracket 38, leg 56 of mounting bracket 38 is configured like leg 54 with first and second appendages 78 and 80, and a slot 84.

Figure 4:
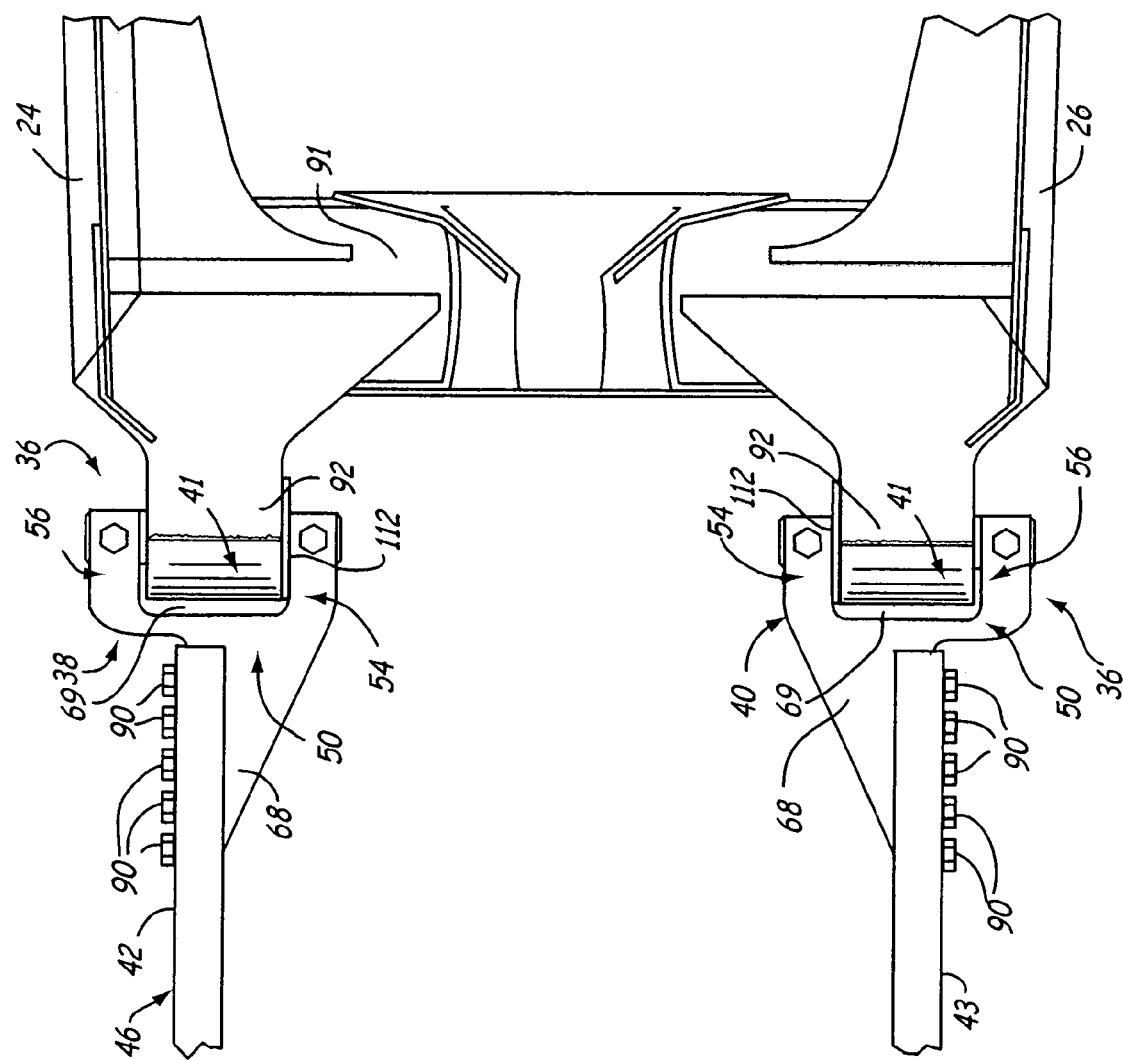
FIG. 4 is a top view of the pivot mount system.

FIG. 4 is a top view of pivot mount system 36. Mounting brackets 38 and 40 are attached to first and second frame members 42 and 43 of vehicle frame 46 by fasteners 90, such as huck bolts. A cross member 91 is connected to arms 24 and 26, cross member 91 being spaced from first ends 92 of arms 24 and 26, respectively.

As seen in FIG. 4, mounting brackets 38 and 40 are identical and are attached to vehicle frame 46 in a mirror-image arrangement with gussets 68 oriented toward one another. Pivot bearings 41 at ends 92 of arms 24 and 26 are received in spaces 69 between the pair of spaced legs 56 and 54a of mounting brackets 38 and 40, respectively. End plates 112 are positioned over pivot pins 44 and placed in contact with an end of bearing housings 98 facing leg 54.

Figure 5:
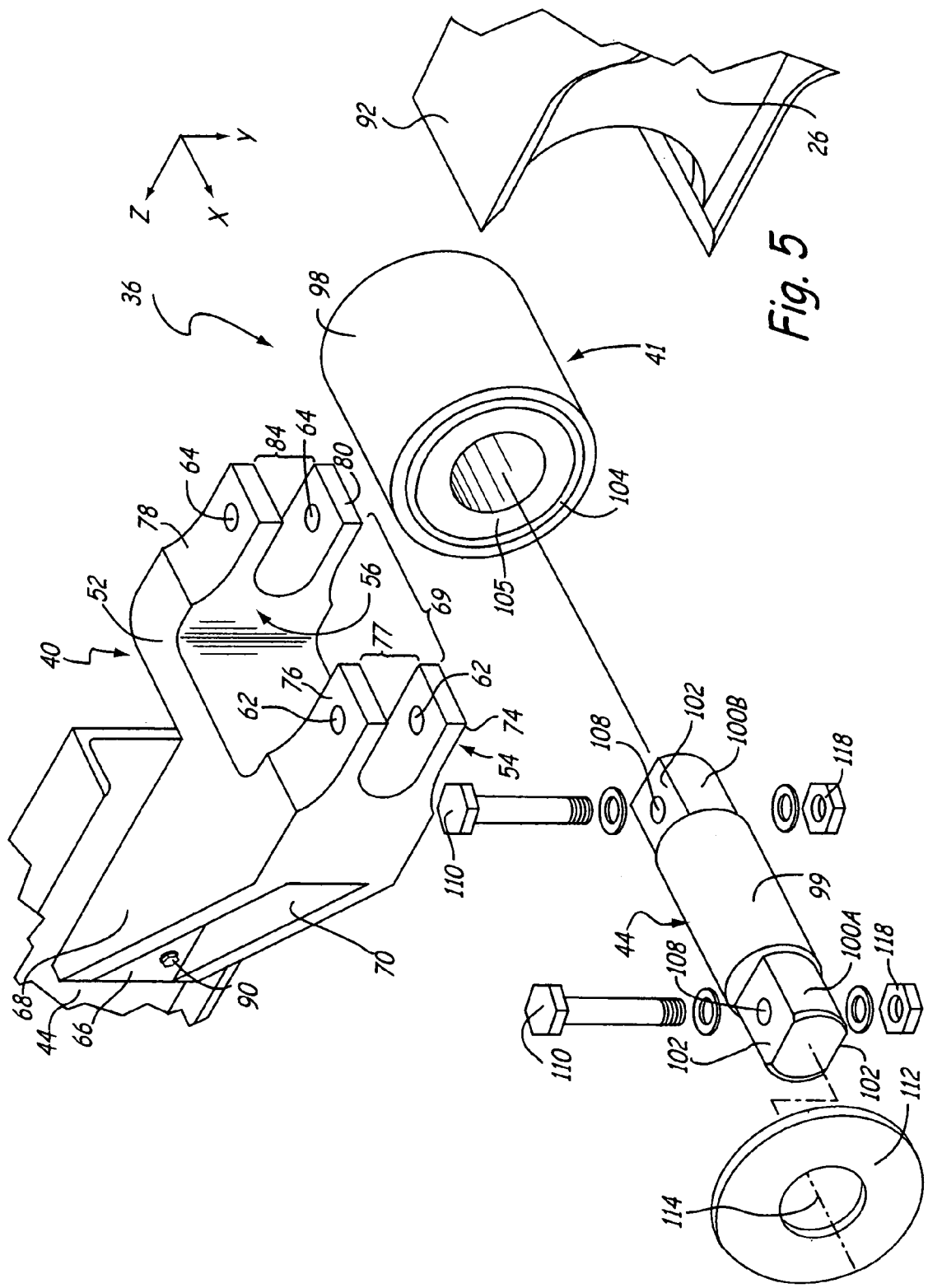
FIG. 5 is an exploded perspective view of an arm and the mounting bracket illustrating the assembly of the pivot mount system

FIG. 5 is an exploded perspective view of arm 26 and mounting bracket 40 illustrating the assembly of pivot mount system 36. As shown in FIG. 5, first end 92 of arm 26 is configured to mate with the curved outer surface of bearing housing 98. Bearing housing 98 is secured to arm 26 by welding. Pivot pin 44 has a cylindrical center portion 99 and opposing end portions 100A and 100B which are machined to define generally parallel upper and lower planar faces 102. Center portion 99 of pivot pin 44 is sized to fit within cylindrical polymer bearing 105 that is positioned within an outer sleeve 104 of pivot bearing 41, with end portions 100A and 100B extending beyond each end of pivot bearing 41. Each end portion 100A and 100B is provided with a hole 108 that extends between planar faces 102. While FIG. 5 shows an exploded view of pivot bearing 41, pivot bearings typically are preassembled components and pivot pin 44 is typically pre-installed within cylindrical polymer bearing 105 of pivot bearing 41.

End portions 100A and 100B are dimensioned to fit closely in spaces 77 and 84, respectively, with planar faces 102 adjacent to appendages 74, 76, 78 and 80. Holes 108 of end portions 100A and 100B axially align with holes 62 and 64 in legs 54 and 56.

End plate 112 having an opening 114 is positioned over end portion 100A of pivot pin 44 and placed in contact with an end of bearing housing 98 facing leg 54 (see FIG. 4). To secure pivot bearing 41 to mounting bracket 40, holes 108 of end portions 100A and 100B are aligned with holes 62 and 64, respectively, of legs 54 and 56. Bolts 110 are then passed through holes 108, 62 and 64 and secured by nuts 118. Arm 24 is connected to mounting bracket 38 in similar fashion.

Pivot mount system 36 provides an alternative means for pivotally mounting arms 24 and 26 of booster axle assembly 12 to truck frame 46.

Although the present invention has been described with reference to preferred embodiments, workers skilled in the art will recognize that changes may be made in form and detail without departing from the spirit and scope of the invention.

The invention claimed is:

1. A mounting bracket capable of attachment to a vehicle frame for pivotally connecting a booster axle assembly having a pair of spaced arms, each arm having a first end and a second end, and an axle connected between the pair of spaced arms near the second end of the arms, the mounting bracket comprising:

a U-shaped portion having a base disposed in a plane extending in X and Y dimensions and a pair of spaced legs connected to the base and extending in a first direction generally normal to the base in a Z dimension, each leg of the pair of spaced legs having a free end, the pair of spaced legs and base defining a space for receiving the first end of one of the arms of the booster axle assembly, wherein each leg defines first and second appendages spaced apart in the Y dimension, the first and second appendages of each leg defining a slot that extends in the Z dimension from the free end of the leg toward the base; and a mounting plate connected to the base of the U-shaped portion and extending in a second direction normal to the base in the Z dimension.

2. The mounting bracket of claim 1, and further comprising aligned openings extending through the first and second appendages of the pair of spaced legs in the Y dimension.

3. The mounting bracket of claim 1, and further comprising a plurality of openings in the mounting plate for attaching the mounting bracket to the vehicle frame.

4. The mounting bracket of claim 1, and further comprising a gusset connecting the mounting plate and the base of the U-shaped portion.

5. The mounting bracket of claim 4, wherein the gusset is disposed substantially in a plane extending in the X and Z dimensions.

6. The mounting bracket of claim 1 wherein the slot extends substantially up to the base.

7. The mounting bracket of claim 1 wherein the U-shaped portion and the mounting plate are formed unitarily.

8. A pivot mount system for pivotally mounting a booster axle assembly to first and second frame members of a vehicle frame, wherein the booster axle assembly comprises a pair of spaced arms having first and second ends and an axle connected to the pair of spaced arms at the respective second ends of the pair of spaced arms, the pivot mount system comprising:

a mounting bracket attached to each of the first and second frame members near a rear of the vehicle frame, each mounting bracket comprising:

a U-shaped portion having a base disposed in a plane extending in X and Y dimensions and a pair of spaced legs connected to the base and extending in a first direction generally normal to the base in a Z dimension, each leg of the pair of spaced legs having a free end, the pair of spaced legs and base defining a space for receiving the first end of one of the arms of the booster axle assembly, wherein each leg defines first and second appendages spaced apart in the Y dimension, the first and second appendages of each leg defining a slot that extends in the Z dimension from the free end of the leg toward the base; and a mounting plate connected to the base of the U-shaped portion and extending in a second direction normal to the base in the Z dimension, the mounting plate secured to a respective frame member of the vehicle frame;

a bearing housing connected to the first end of each arm of the pair of spaced arms, the bearing housing containing a pivot bearing therein, the pivot bearing defining a central opening, the bearing housing positioned in the space of the mounting bracket; and a pivot pin having a length in the X dimension positioned within the central opening of the pivot bearing with opposing end portions of the pivot pin exposed on opposite sides of the bearing housing, the end portions of the pivot pin secured within the slots of the mounting bracket.

9. The pivot mount system of claim 8, wherein the mounting bracket further comprises aligned openings extending through the first and second appendages of the pair of spaced legs in the Y dimension, for connecting the mounting bracket to the pivot pin.

10. The pivot mount system of claim 8, and further comprising a plurality of openings in the mounting plate for attaching the mounting bracket to the vehicle frame.

11. The pivot mount system of claim 8, and further comprising a gusset connecting the mounting plate and the base of the U-shaped portion.

12. The pivot mount system of claim 8 wherein the slot extends substantially up to the base.

13. The pivot mount system of claim 8 wherein the U-shaped portion and the mounting plate are formed unitarily.

14. The pivot mount system of claim 8, wherein the bearing housings are welded integrally to the end of each arm.

15. A pivot mount system for pivotally mounting a booster arm assembly to a vehicle frame the pivot mount system comprising:

a U-shaped portion having a base disposed in a plane extending in X and Y dimensions and a pair of spaced legs extending in a Z dimension, the spaced legs defining a pair of connection sites for connecting the U-shaped portion to a pivot bearing; and a mounting plate disposed in a first plane extending in the Y and Z dimensions, the first plane arranged generally parallel to the pair of connection sites and substantially between the pair of connection sites, wherein the mounting plate and the U-shaped portion are formed unitarily, and wherein the mounting plate is attached to a frame member of the vehicle frame and the mounting plate is located adjacent one side of the frame member.

16. The pivot mount system of claim 15, wherein the pivot bearing is removably connected to the U-shaped member and permanently connected to the booster arm assembly.

* * * * *